Sept. 5, 1967      G. J. NOSSOL      3,339,235

EXTRUSION HEAD

Filed Feb. 12, 1965      2 Sheets-Sheet 1

Inventor:
Gerhardt Johannes Nossol
By Walter Becker

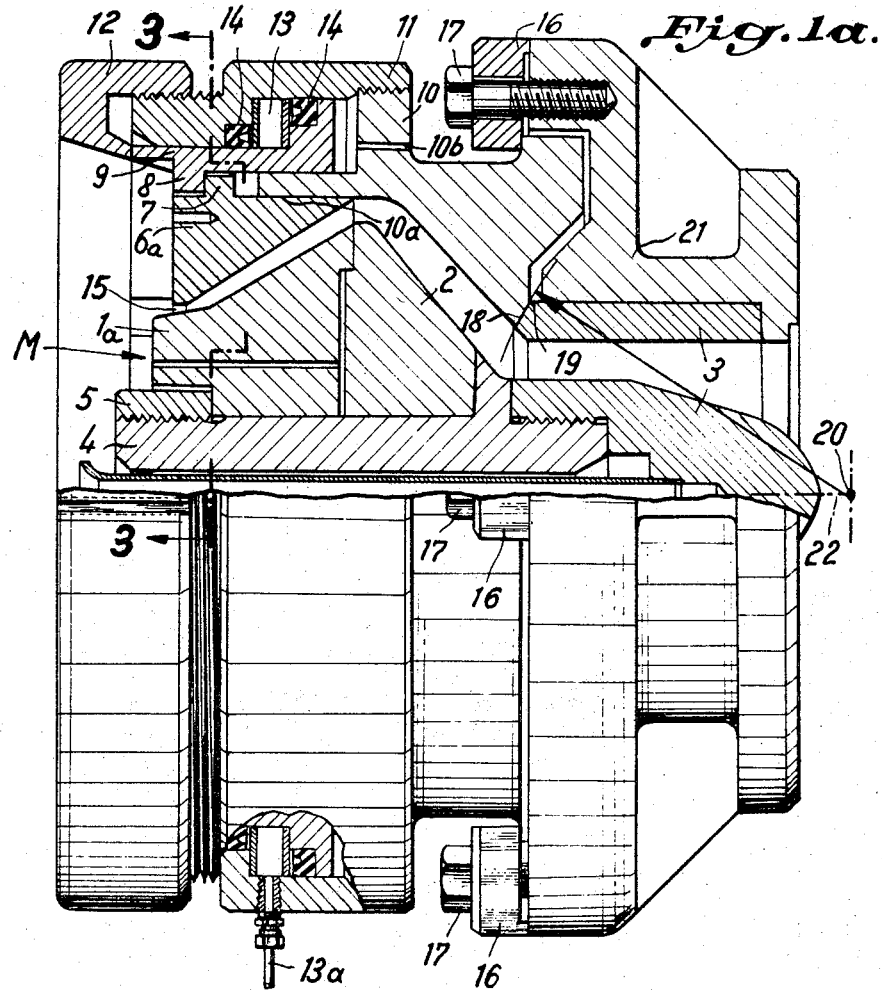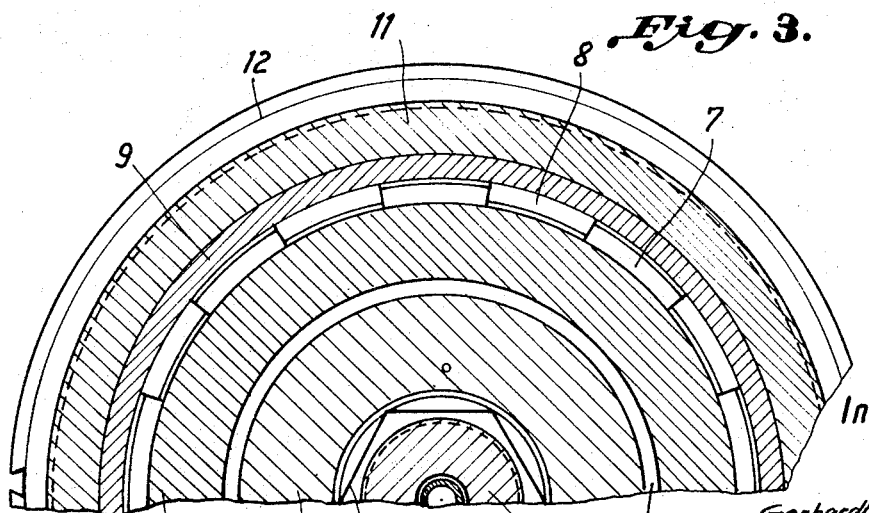

United States Patent Office 3,339,235
Patented Sept. 5, 1967

3,339,235
EXTRUSION HEAD
Gerhardt Johannes Nossol, Hamburg-Fuhlsbuttel, Germany, assignor to Beteiligungs- und Patentverwaltungsgesellschaft mit beschrankter Haftung, Essen, Germany
Filed Feb. 12, 1965, Ser. No. 432,299
5 Claims. (Cl. 18—14)

The present invention relates to an extrusion head for producing tubular members of plastic material, for instance hoses of rubber material, in which the matrix for producing different wall thicknesses may be adjusted during the extrusion operation, and in which the carrier for the extrusion tool will permit an equalization or compensation of different wall thicknesses.

The main components of an extrusion head for producting hoses consist, as is well known, of a matrix for producing the outer diameter of the hose wall, and of a mandrel for producing the inner diameter of the hose wall. The magnitude of the annular gap formed by these components, and thus the thickness of the hose wall, is varied by an axial adjustment of the matrix or of the mandrel which latter is of a conical or crowned design.

With heretofore known extrusion heads for producing hoses of plaastic material, the said axial adjustment of the matrix or of the mandrel for changing the thickness of the hose wall to be produced is effected by threaded rings or similar thread constructions. However, when hoses are to be extruded which have a rather large diameter, the forces acting upon the extrusion tool, viz. the mandrel and the matrix, increase with the diameter of the hose to be extruded by the fourth power, and the forces required for effecting an adjustment of mandrel and matrix become too great in view of the unavoidable friction.

It is, therefore, an object of the present invention to provide an extrusion head, which will overcome the above-mentioned drawback.

It is another object of this invention to provide an extrusion head of the type set forth above, which will make it possible, in a simple manner, to effect a correction of the wall thickness of the hose to be produced, at any desired sections.

These and other objects and advantages of the invention will appear more clearly from the following specification in connection with the accompanying drawing in which FIG. 1 illustrates an extrusion head partially in section and partially in view;

FIG. 3 is a section along the line III—III of FIG. 1a.

Figure 1:
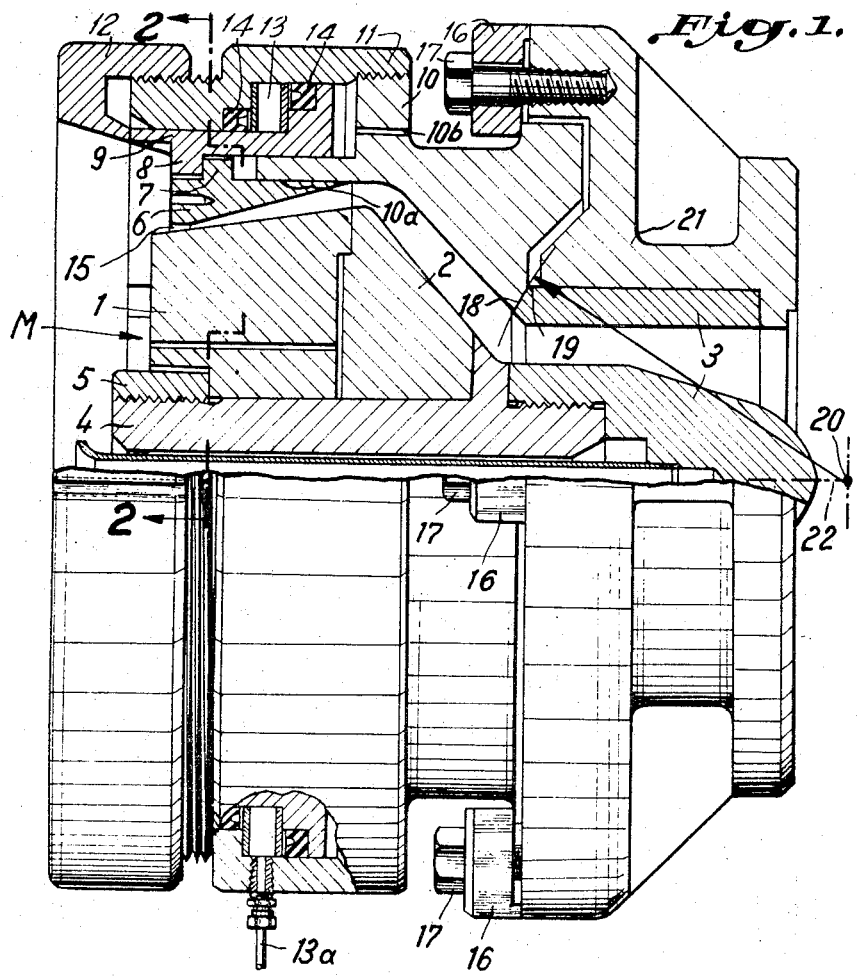
FIG. 1a is a section similar to FIG. 1 but differs from that of FIG. 1 in the employment of a different matrix and of a different front mandrel component for producing hoses of smaller diameter.
Figure 2:
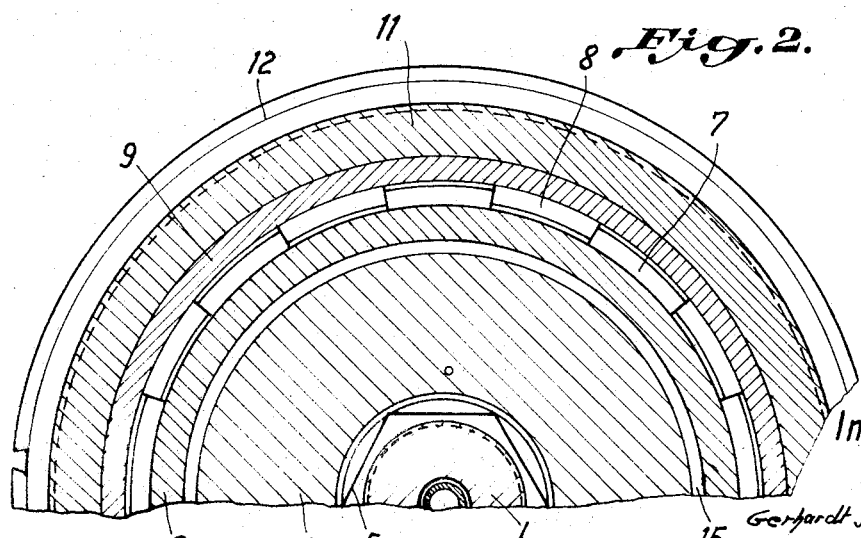
FIG. 2 is a section taken along the line II—II of FIG. 1.

The extrusion head according to the present invention is characterized primarily in that the female die member or matrix which is axially and radially guided in the carrier for the extrusion tool is equipped with a fluid operable annular piston for adjustment of the annular gap through which the hose material is to be extruded.

More specifically referring to the drawing, the extrusion head illustrated therein comprises a male die member or mandrel generally designated M, which determines the inner diameter of the hose to be produced. This mandrel M comprises a front mandrel component 1 and an adjacent rear mandrel component 2. Both components 1 and 2 are held together by means of a mandrel holder bolt 4 which is screwed into a mandrel holder 3 and is secured by means of a nut 5. A female die member or matrix 6 is by means of a bayonet pin or dog 7 axially locked to an annular piston 9 likewise equipped with a bayonet pin or dog 8 so that die 6 is axially and radially guided in bore 10a of carrier 10 for the extrusion tool. A cylinder 11 for the annular piston 9 is screwed onto carrier 10 for the extrusion tool, whereas an adjusting ring 12 is screwed onto cylinder 11. If now, for instance through a conduit 13a, pressure fluid, for instance oil under pressure, is conveyed into the annular chamber 13 confined by cylinder 11 and annular piston 9, annular piston 9 will be subjected to fluid pressure and will move in cylinder 11 while simultaneously, due to its bayonet connection with matrix 6, causing the latter axially to move in extrusion tool carrier 10 in the same direction as annular piston 9. Annular chamber 13 is sealed against leakage by sealing means 14. When in this way the annular gap 15 has been adjusted in conformity with the desired wall thickness and diameter of the hose to be produced, adjusting ring 12 is tightened against annular piston 9 to thereby prevent the latter, and thus also matrix 6, from being displaced during the manufacture of the hose.

If it is desired to vary the wall thickness of the hose during the manufacturing process, it is merely necessary to correspondingly adjust the adjusting screw 12, for instance by correspondingly screwing adjusting screw 12 outwardly. Due to the pressure of the material being extruded upon the conical surface of matrix 6, the latter together with the annular piston 9 will slide back until piston 9 again engages adjusting ring 12.

If it is desired to exchange matrix 6, this can be effected in a very simple manner by a mere turning of annular piston 9. Matrix 6 can then be removed and replaced by a corresponding desired matrix. The drawing illustrates in FIGS. 1a and 3 a die 6a and a front mandrel component 1a for producing hoses of a smaller diameter than would be produced with matrix 6 and mandrel component 1, shown in solid lines.

Uneven wall thicknesses of a hose to be produced may be effected or equalized by means of an adjusting device comprising a clamping member 16 and clamping screws 17. By means of the said elements 16 and 17, carrier 10 for the injection tool is adapted to have its end face 18 clamped against the crowned end face 19 of the mandrel holder 3. End face 19 of mandrel holder 3 forms a portion of a spherical or ball surface the center point 20 of which is located on the central axis 22. By correspondingly tightening or loosening clamping screws 17 which are screwed into a flange member 21 which serves for connecting the extrusion head to an extrusion machine, the end face 18 of the extrusion tool carrier 10, and thus also matrix 6 guided by carrier 10 will slide on the crowned end face 19 of mandrel holder 3 and will thus, in a simple manner, make possible a correction of the wall thickness of the hose being produced, at the desired areas.

It is, of course, to be understood, that the present invention is, by no means, limited to the particular construction shown in the drawing, but also comprises any modifications within the scope of the appended claims.

What I claim is:
1. An extrusion head for producing tubular means, especially large diameter hoses of rubber material, which includes: a first member forming a mandrel, a second member forming an annular matrix surrounding said first member in radially spaced relationship thereto and defining therewith an annular extrusion passage with a material inlet and a material outlet, the cross-section of said extrusion passage decreasing in the direction toward said outlet, one of said members being axially movable relative to the other member to thereby vary the cross-section of said outlet, and fluid operable annular cylinder piston means extending around said first and second members and being operatively connected to said axially movable member for axially adjusting the same relative to the other member, said fluid operable cylinder piston means including means for axially guiding said axially adjustable member.

2. An extrusion head for producing tubular means, especially large diameter hoses of rubber material, which includes: a mandrel, a matrix surrounding said mandrel in radially spaced relationship thereto and confining therewith an annular extrusion passage with a material inlet and a material outlet, the cross-section of said extrusion passage decreasing in the direction toward said outlet, said matrix being axially movable relative to said mandrel to thereby vary the cross-section of said outlet, a supporting member comprising a bore reciprocably receiving said matrix and axially guiding the same during an axial movement of said matrix relative to said mandrel, said supporting member also comprising means defining an annular cylinder surrounding said first and second members, fluid operable annular piston means reciprocable in said annular cylinder and operatively connected to said matrix for axially displacing the latter in said bore in conformity with the desired cross-section of said outlet, and adjustable mechanical stopping means for holding said mandrel during an extrusion operation in the respective position for the adjusted desired cross-section of said outlet.

3. An extrusion head according to claim 2, in which said matrix and said fluid operable annular piston means are interconnected by bayonet joint means.

4. An extrusion head for producing tubular means, especially large diameter hoses of rubber material, which includes: a first member forming a mandrel, supporting means supporting said mandrel and having a first spherical surface, a second member forming an annular matrix surrounding said first member in radially spaced relationship thereto and confining therewith an annular extrusion passage with a material inlet and a material outlet, the cross-section of said extrusion passage decreasing in the direction toward said outlet, said second member being axially movable relative to said first member to thereby vary the cross-section of said outlet, annular cylinder means coaxially arranged with regard to said second member and including guiding means for axially guiding said second member during an axial movement thereof, said guiding means being provided with a second spherical surface area tiltably and slidably engaging said first spherical area for adjustment relative thereto, means operable to engage and tilt said guiding means relative to said supporting means, and fluid operable annular piston means reciprocable in said cylinder means and detachably connected to said axially displaceable second member for axially adjusting the latter relative to said first member.

5. An extrusion head according to claim 2, in which said mechanical stopping means is formed by an adjustable nut threadedly engaging an outer peripheral portion of said annular cylinder and having an extension in axial direction of said nut, said extension forming an abutment for said annular piston means.

References Cited
UNITED STATES PATENTS

| | | | |
|---|---|---|---|
| 1,947,202 | 2/1934 | Homeir | 18—12 |
| 2,044,961 | 6/1936 | Waner | 18—14 |
| 2,048,004 | 7/1936 | Hentzell et al. | 18—14 X |
| 2,461,856 | 2/1949 | Tornberg | 18—12 |
| 2,486,474 | 11/1949 | Henning | 18—12 X |
| 2,773,283 | 12/1956 | Malamoud et al. | 18—13 |
| 2,859,476 | 11/1958 | Lainson | 18—13 |
| 3,184,792 | 3/1965 | Commisso. | |
| 3,186,032 | 6/1965 | Harwood | 18—14 |
| 3,205,534 | 9/1965 | Langecker | 18—14 |

WILLIAM J. STEPHENSON, *Primary Examiner.*

J. SPENCER OVERHOLSER, *Assistant Examiner.*